cial=United States Patent Office 3,072,533
Patented Jan. 8, 1963

3,072,533
CRYSTALLINE VITAMIN D COMPOSITION AND
METHOD OF PREPARING SAME
Henry J. Johnson, 5309 W. 65th Place, Mission, Kans.
No Drawing. Filed Nov. 15, 1960, Ser. No. 64,670
15 Claims. (Cl. 167—81)

This invention relates to a novel vitamin D enrichment composition for food products, as well as to an improved process for producing a vitamin D fortifying material which will readily disperse in various types of fluid food products and which is especially advantageous for enriching milk. The invention is particularly directed to a method of processing commercially available crystalline vitamin $D_2$ and vitamin $D_3$ so that the same will readily disperse in milk and other similar liquid compositions.

Vitamin $D_2$ and vitamin $D_3$ fortifying compositions for milk products have been used for a number of years to enrich milk, but the insolubility of crystalline $D_2$ and $D_3$ in water and thereby milk, has necessitated dispersion of the vitamin D in an oleaginous carrying agent in conjunction with an emulsifier so that some degree of dispersion of the vitamin material in the milk product may be obtained upon introduction of the enrichment composition into a quantity of the milk. Vitamin $D_2$ and vitamin $D_3$ in crystalline form are soluble only in organic solvents such as propylene glycol and sesame oil and therefore the enrichment preparations have been available only in liquid form.

In the preparation of prior fortification compositions, crystalline vitamin $D_2$ and vitamin $D_3$ were added to an oily carrier such as butter oil, sesame and certain other vegetable oils as well as propylene glycol. These carriers were used as a matter of necessity and not as a matter of choice or preference. In order to cause the vitamin material to be dispersed throughout the oleaginous carrier, emulsification agents were introduced into the material in an attempt to improve the dispersibility of the crystalline $D_2$ or $D_3$. One widely used liquid fortification composition employed butter oil as the carrier with evaporated milk being incorporated into the admixture for emulsification purposes while chemical emulsifiers were used with vegetable oil carriers. It was recognized that in order to provide a reasonable degree of dispersion of the butter oil and vegetable oils in the milk, some type of emulsifier was necessary. Liquid fortification compositions were not satisfactory from many standpoints because of inability to adequately control the actual quantities of vitamin material introduced into the milk by virtue of the inherent characteristics of the enrichment product, incompatibility of the oleaginous composition with the milk products, and lack of stability of the carrier for the vitamin $D_2$ and $D_3$ preparations if exposed to the air for a period of time while under refrigeration.

Milk processers and dairies purchased the liquid enrichment compositions as referred to above and normally added predetermined amounts thereof to at least 2 gallons of fluid milk followed by agitation of the mixture, which was then introduced into a vat or tank of milk to be fortified. The milk in the mixing vat or tank was subjected to agitation for approximately 2 hours in an effort to disperse the vitamin product throughout the entire quantity of milk. Although the oil carrier and vitamin composition were broken into extremely small globules during the above process and particularly after extended agitation of the milk, it was found that true dispersion of the enrichment globules was not obtained in the milk regardless of the time of agitation. Complete dispersion of the oily globules in the milk, which consists primarily of water, is rendered impossible even under conditions of extensive agitation of the milk because of the incompatibility of the enrichment composition with the water and the tendency of the oil globules to agglomerate and inability of the composition to dissolve in the water. It can be recognized that the oil globules, being of less density than the milk, tended to rise to the top of the tank of milk after discontinuance of the agitation and thereby resulting in nonuniform dispersion of the vitamin $D_2$ and $D_3$ in the liquid. As evidence of nondispersibility of the oily enrichment compositions in the milk, is the fact that dairies continued agitation of the enriched milk throughout the time of bottling thereof in order to keep the milk in constant agitation for as long a period as possible. It was found in fact, that a considerable percentage of the vitamin enrichment composition was trapped in the foam at the top of the tank produced during turbulent agitation of the milk and it can be seen that the vitamins were thereby lost because the foam remains in the tank after bottling of the milk has been completed. The major difficulty arising from the attempt to disperse the liquid fortification composition in the milk is primarily attributable to the incompatibility between the oleaginous carriers for the vitamin compositions and the milk itself, with it being impossible to obtain a permanent and uniform dispersion of the vitamin materials in the milk even when considerable amounts of emulsifiers were added to the enrichment compositions. There was also little, if any, affinity between the oils utilized in conjunction with the crystalline vitamin $D_2$ and vitamin $D_3$, and the milk solids, and thus causing unsatisfactory dispersion of the vitamin materials. The problems extended to whole fresh milk which is fortified with vitamin $D_2$, as well as to evaporated milk which is normally enriched with vitamin $D_3$.

The oleaginous compositions containing vitamin $D_2$ or vitamin $D_3$ and prepared in accordance with prior practices, were packaged in accordance with three different processes, all of which presented problems which have not heretofore been solved. The butter oil preparations which were emulsified with evaporated milk were packaged in tin cans. It can be recognized that after opening of a can, and which oftentimes contained more liquid than was required for fortification purposes on the day of opening of such can, this being particularly true with respect to small dairies and the like, the contents of the can were subjected to contamination and evaporation, and had to be kept under refrigeration at all times. Tests disclosed that opening of the can and then permitting the same to sit for some time under refrigeration before the product was used up, resulted in evaporation of water from the material thereby causing a layer of thick, gummy oil to be formed at the top of the liquid substance.

Other preparations, such as those comprising vitamin $D_2$ or vitamin $D_3$, a vegetable oil and a chemical emulsifier, were packaged in glass or synthetic resin containers, and although this overcame the disadvantage of reaction of the metallic material present in the cans with the components of the enrichment composition, it is to be noted that this method of packaging did not overcome the formidable problem relating to measuring of the required amount of enrichment material or introduction into a specified quantity of milk. Not only was considerable time consumed in the measurement process, but so many uncontrollable variables were present in the measuring operation as to cause a substantial amount of waste of the fortification composition by virtue of the fact that it was standard procedure to utilize an overage in order to compensate for measurement errors. For example, in smaller dairies where many loads of 200 to 500 gallons of milk were mixed at a time, only 2 to 5 milliliters of the enrichment composition were required for enrichment purposes. For safety purposes, many dairies use plastic graduates for measuring the enrichment preparation and since the amount of material in the graduate cannot be determined from the side because of optical properties of the plastic and must be read from the top thereof, considerable errors in the measurement obviously result. The plastic also has sufficient affinity for the oil to cause a considerable amount of the material to cling to the graduate, thereby increasing the measurement error. Even when glass graduates are used, errors obtain because a substantial percentage of the oily vitamin preparation clings to the surface of the measuring glass or graduate and therefore, even with careful rinsing, all of the enrichment material is not removed from the glass and requiring introduction of an overage into the vat of milk in order to assure that the designated amount of vitamin D is introduced into the milk product. It can be recognized that any composition that requires a method of measuring which must make wide allowances for uncontrollable variable factors should be considered undesirable and uneconomical.

Another unsatisfactory method of providing a vitamin enrichment composition for milk was to pack the vegetable oil emulsified vitamin preparation in an aerosol container with compressed nitrogen being used as the propellant. The most serious problem associated with this method of dispensing of the enrichment composition lay in the fact that upon introduction of the material into a graduate or other measuring device, a myriad of bubbles was formed which had to be dissipated before any accurate measurement could be made. The viscosity of the solution made dissipation of the bubbles very slow and virtually impossible in many instances. It is to be recognized that the presence of any substantial proportion of bubbles in the liquid resulted in a serious error in the enrichment operation with either too little fortifying material being introduced into the milk or an overage being used to compensate for any possible inaccuracy in the measurement.

The problems discussed above were magnified when it was desired to provide an enrichment composition containing both vitamin A and vitamin D because of the large volume of oil required in order to provide the necessary amount of vitamin A. As previously stated, it was absolutely necessary to use an oil vehicle for the vitamin $D_2$ or vitamin $D_3$ because of the insolubility of these crystalline materials in water and thereby in milk products. Since the vitamin D fraction of the enrichment composition was incorporated into an oil base, it can be seen that it was also necessary to admix the vitamin A therewith so that all of the fortification materials could be introduced into the milk in a single application. Although crystalline vitamin $D_2$ and vitamin $D_3$ are available as 40,000,000 U.S.P. units of the vitamin per gram of the material, a vitamin A composition, which is utilizable in fortifying milk, cannot be obtained in a form having more than 250,000 U.S.P. units per gram. Since most fortification specifications call for only 400 U.S.P. units of vitamin D per quart of milk, but require at least 2,000 U.S.P. units of vitamin A in the same quart of milk, it can be seen that considerably more vitamin A material must be present in the enrichment composition then crystalline vitamin D. The volumes of oil required to disperse the relatively large quantities of vitamin A increased the difficulty of dispersing the vitamin materials in milk for the reasons outlined and furthermore, necessitated the use of significantly larger amounts of emulsifiers and other similar agents. For example, in order to fortify 100 gallons of milk, it was necessary to utilize 3 ounces of the oil fortification solution containing both vitamin A and vitamin $D_2$ or vitamin $D_3$.

When butter oil is employed as the carrier for the vitamin $D_2$ or $D_3$, evaporated milk is used as the emulsifier therein in order to provide what is generally termed a pure milk carrier. However, evaporated milk contains 74% water which makes it a very poor emulsifier because obviously, water cannot be used as an oil emulsification agent. The solids in evaporated milk are similar to the solids in butter oil except for the degree of concentration and refinement. It is, of course, apparent that one type of solids will not emulsify a similar type of solids. Another serious disadvantage to the butter oil-evaporated milk combination is the fact that butter oil solidifies at approximately 38° F., thus causing a separation between the butter oil and the evaporated milk if the ambient temperature is permitted to fall below the stipulated value. In order to produce the best possible solution of butter oil and evaporated milk, the two ingredients are homogenized but this homogenization may easily be destroyed with solidification and separation resulting if the temperature of the material falls below approximately 38° F. Another distinct disadvantage of the utilization of butter oil and evaporated milk as a carrier for vitamin $D_2$ or $D_3$ is the fact that the composition must be kept under refrigeration at all times but above the temperature at which separation and solidfication take place. It can be seen that in shipment of the composition to the northern half of the United States, such shipments must be made during the month of October for the following five months in order to preclude separation of the ingredients. All of the above disadvantages and requirements show that the oil and emulsifier combination is used as a matter of necessity and not because of choice or preference.

The enrichment preparations utilizing vegetable oil carriers for the vitamin $D_2$ or $D_3$ require a chemical emulsifier which is usually a glycol. The vegetable oil-glycol preparations consist of approximately one-third propylene glycol in order to obtain a reasonable degree of dispersion of the vitamin composition in the milk. Glycol is not a desirable ingredient to be incorporated into milk and in many instances is considered an adulterant, thereby further demonstrating that vegetable oil-glycol preparations are employed as a matter of necessity rather than through preference.

It is therefore the primary object of the present invention to provide an enrichment composition which avoids the problems set forth above, is economical to manufacture and use, and is not subject to deterioration or contamination during storage thereof.

In particular, it is a very important object of the invention to provide a fortification composition which contains vitamin $D_2$ or vitamin $D_3$ and is in wafer form to eliminate the necessity of measuring the enrichment composition prior to introduction of the same into milk or other similar liquid food products, and with uniform dispersion of the vitamin D material in the milk being assured.

A further important aim of the invention is to provide a vitamin $D_2$ or vitamin $D_3$ enrichment composition which is in wafer or tablet form and will disperse in a relatively large quantity of milk in a short period of time, with very little agitation time being required in order to effect complete dispersion of the enrichment material.

Also an important object of the invention is to provide a vitamin $D_2$ or vitamin $D_3$ milk fortification preparation that will remain dispersed in the milk for a substantially indefinite period of time and without subsequent agitation of the milk being required.

A further important object of the invention is to provide a vitamin $D_2$ or $D_3$ enrichment composition wherein the vitamin $D_2$ or $D_3$ fraction is combined with a carrier having an affinity for the solids in the milk to thereby assure uniform dispersion of the enrichment composition throughout the milk and preferably of a nature to cause the particles of the fortification material to adhere to the fat globules of the milk and thereby preclude separation of the vitamin from such globules. In this respect, it is to be noted that an additional object is to provide an enrichment composition wherein the ingredients thereof are compatible with both the milk solids and the water in the milk so that complete and absolute dispersion is secured in a minimum of time and for an indefinite period. An allied object relates to provision of a vitamin $D_2$ or vitamin $D_3$ fortification material composed of substances which cannot be considered adulterants for the milk in any sense of the word and thereby meet all governmental standards and requirements.

Also an important object of the invention is to provide an improved method of processing crystalline vitamin $D_2$ and $D_3$ in a manner so that the same may be compressed into wafer form for introduction into milk or milk products for dispersion of the vitamin therein, with the dispersion taking place quickly and uniformly throughout the milk. An additional aim is to provide a method as described wherein other ingredients are incorporated into the wafer to assure rapid disintegration of the latter in the milk and to permit manufacture of a wafer of predetermined size and containing a selected amount of the vitamin composition.

Briefly, the present invention contemplates admixing a selected amount of pure crystalline vitamin $D_2$ or $D_3$ with a sufficient quantity of ethyl alcohol to dissolve the crystalline vitamin. Additionally, a synergist for the vitamin $D_2$ or $D_3$ and preferably ascorbic acid, is dissolved in a suitable amount of alcohol and then combined with the solubilized vitamin $D_2$ or $D_3$. A carrier which is compatible with milk and milk products and which has a natural affinity for the constituents of milk, is introduced into the mixture of vitamin $D_2$ or $D_3$ and ascorbic acid, with the preferred material being finely divided lactose. The composition is thoroughly mixed and then poured onto glass plates or trays for evaporation of the alcohol and drying of the composition. If required, currents of air may be passed over the material in order to hasten evaporation of the alcohol. Wheat starch serving as a disintegrant and stearic acid as a lubricant are admixed with the dried composition and the latter is compressed into wafers of predetermined size and weight. The wafers may be used to enrich milk by the simple expedient of dissolving one or more wafers in a small quantity of water, followed by pouring of the liquid into the milk. It is also to be understood that the wafers could be dissolved in a small quantity of milk prior to introduction of the liquid into the vat containing a predetermined amount of milk to be fortified.

As indicated above, the instant invention is particularly concerned with a method of dispersing pure crystalline vitamin $D_2$ or vitamin $D_3$ in milk or milk products and which are normally not compatible with the vitamins or carriers heretofore employed in conjunction with emulsification agents. Vitamin $D_2$, and comprising pure crystalline activated ergosterol and sold under the trademark Calciferol, as well as vitamin $D_3$ which is pure crystalline activated 7-dehydrocholesterol, are sold commercially in the form of 40,000,000 U.S.P. units of the vitamin per gram of material. As stated briefly above, an initial particulate composition is prepared which effects solubilization of the vitamin $D_2$ or vitamin $D_3$ material, and which composition is then incorporated into suitable base materials for tableting operations. One example of an initial formulation and embodying the preferred concepts of the present invention may be produced by combining the following ingredients:

| | Parts by weight |
|---|---|
| Vitamin $D_2$ (40,000,000 U.S.P. units/gram Calciferol) | 250 |
| Ascorbic acid | 25 |
| Lactose | 225 |

The 250 parts by weight of crystalline vitamin $D_2$ is dissolved in a quantity of ethyl alcohol sufficient to effect substantial dissolution of the vitamin material. As a specific example, assuming that the vitamin D constitutes 250 grams of the pure crystalline material, the same should be dissolved in approximately 100 to 200 ounces of 90% ethyl alcohol and, preferably, 180 to 200 ounces of said alcohol. Next, 25 grams of the ascorbic acid is introduced into 12 ounces of alcohol and mixed until solution is obtained. The two solutions are then combined and an amount of lactose sufficient to absorb all of the alcohol, preferably about 1125 grams thereof, is added, followed by thorough agitation. The admixture is subsequently poured on glass plates or trays for evaporation of the alcohol and thereby drying of the same. As previously noted, currents of air may be passed over the composition to increase the rate of evaporation of the alcohol. The above material, in the quantities set forth, is sufficient to produce 5,000 wafers having 0.040 gram of the vitamin material therein and in conjunction with fillers to be described. It is necessary to pulverize the composition after drying thereof and preferably to a particle size so that the same will pass through approximately a 60 mesh screen.

Another formulation which may be processed in accordance with the procedure outlined under the above example is identical as to components and relative proportions with the exception that vitamin $D_3$ of 40,000,000 U.S.P. units per gram is substituted for the vitamin $D_2$.

In formulating a complete admixture adapted to be compressed into tablet or wafer form in a conventional tableting machine, it is preferred that other materials be added to the admixture prepared in accordance with the examples above. The aditional substances preferably comprise a base which is additional lactose, a disintegrant in the nature of wheat starch, and a lubricant such as stearic acid. The preferred quantities of lactose and wheat starch are first thoroughly admixed, whereupon sufficient water is added thereto to produce a moist, granular mass. This composition is passed through a No. 14 screen and is placed on trays to dry. The granulation is then passed through a somewhat finer screen after which the processed D prepared in accordance with the procedure above, and the stearic acid are added simultaneously to the filler material in an appropriate mixer. Predetermined fractions of the total composition are then compressed into wafers or tablets using a conventional tableting or compression machine. In certain instances, it may be desirable to eliminate the wheat starch and substitute additional quantities of lactose therefor.

It is to be understood that the wafers may have score lines on one major face thereof, dividing the unit into half and quarter sections, to simplify the procedure of fortification of milk with fractional parts of wafers of predetermined weight.

It is to be pointed out that ethyl alcohol is the preferred solvent for the vitamin D material because of the effectiveness of the same in dissolving the crystalline $D_2$ or $D_3$, the nontoxic nature of the same and the fact that the alcohol is readily available at a commercially attractive price. The alcohol should be capable of completely dissolving the vitamin in a short period of time and capable of materially reducing the particle size thereof upon removal of the solvent from the enrichment composition. Ethyl alcohol and equivalent solvents produce the desired result and it should be pointed out that with high potency vitamin products such as those containing 40,000,000 U.S.P. units per gram, it is necessary that the particle size of the vitamin component be extremely small in order to obtain proper dispersion of the enrichment composition in large quantities of milk or milk products.

The method of dissolving the crystalline vitamin D components in alcohol followed by removal of the solvent as described, converts the water insoluble, nondispersible, sluggish, sticky substance to an extremely fine particle size, free-flowing, quickly and completely dispersible in water, stable product which, after further processing as described, will remain dispersed in milk for an indefinite period of time.

A complete fortification formula of preferred proportions is as follows:

| | Grams |
|---|---|
| Vitamin $D_2$ pure crystalline activated ergosterol, or in the alternative vitamin $D_3$ pure crystalline activated 7-dehydrocholesterol | 0.040 |
| Ascorbic acid | 0.004 |
| Stearic acid | 0.030 |
| Lactose | 4.500 |
| Purified wheat starch | 2.226 |

The above formulation is set forth as the preferred amount of materials in one wafer of predetermined preferred size. It is to be understood that in preparing a large quantity of this material, the materials should be in the same relative proportions calculated as parts by weight.

The amount of ascorbic acid in the final composition may be varied within a range of approximately 0.003 to 0.006 when 0.040 gram of vitamin $D_2$ or $D_3$ are used, and the stearic acid, lactose and purified wheat starch may be varied in the same proportions as the ascorbic acid with respect to the vitamin $D_2$ and vitamin $D_3$. The major requirement is that the final wafer be of characteristics permitting the same to readily dissolve in water or milk and which will not stick to the die during compression of the tablets.

The wafer set forth above and having a total weight of 6.8 grams including 0.040 gram of the vitamin material is adapted to fortify 4,000 gallons of milk to a level of at least 400 units of the vitamin D per quart of the liquid and including an appropriate overage.

If desired, vitamin A in the form of palmitate C.W.S. (cold water soluble), which is available on the basis of 250,000 units of the vitamin per gram of the composition, may be incorporated into the enrichment composition in conjunction with the vitamin D material. The amount of vitamin A should be sufficient to enrich each quart of milk to a specified level and of the order of 2,000 units per quart as set forth above.

Note should be taken of the fact that utilization of lactose as a component of the enrichment composition does not in any way adulterate the milk, since lactose is a normal constituent thereof. Lactose has a natural affinity for milk solids, thus assuring dispersion of the crystalline vitamin D in the milk for an indefinite period. Laboratory tests and assays have established that wafers produced in accordance with the present invention require less than 5 minutes' mixing time for complete dispersion of the vitamin components and with the vitamins remaining completely dispersed therein for a substantially indefinite period. The wafers have a long shelf life without significant deterioration or oxidation of the vitamin materials. Furthermore, the utilization of wafers provides premeasured amounts of vitamins for enrichment purposes to eliminate errors and waste products, as well as saving time in fortification operations. The utilization of a dry enrichment preparation also provides a product which gives maximum sanitation and freedom from contamination, and eliminates substantial handling thereof. The product may be shipped or stored under all normal atmospheric conditions and by virtue of the ready dispersibility of the material, complete dispersion of the vitamin $D_2$ or $D_3$ composition in the milk is secured with a minimum of agitation thereof, thus providing a finished milk product that has a longer shelf life and the best possible flavor. Extended agitation of the milk damages the lipase enzymes in the milk, decreases the shelf life and impairs the flavor of the milk. The present enrichment composition substantially decreases the agitation required to effect dispersion of the vitamin D in the milk, thus causing the beneficial results noted above. The addition of ascorbic acid to the composition increases the stability of the crystalline $D_2$ and $D_3$ and futher, constitutes a material which is present in milk at the time of milking and thus this material cannot be considered an adulterant.

In lieu of the lactose as a carrier, dry milk and preferably of the non-fat type may be substituted therefor in suitable proportions. Corn starch may also be used instead of lactose, or an admixture of corn starch and dry milk solids may be employed with the quantities thereof largely being determined by the size of wafer required.

Although the preferred final product is in wafer form for convenience of manufacture, distribution and use, it is to be understood that in lieu thereof, premeasured packets of the finely divided composition may be provided or packaged in capsule form if desired.

This is a continuation-in-part of my application Serial No. 4,226, entitled Fortifying Composition for Milk Products, filed January 25, 1960, now abandoned.

Having thus described the invention what is claimed as new and desired to be secured by Letters Patent is:

1. A process of producing a vitamin D enrichment composition for food products comprising the steps of:
   introducing a quantity of a crystalline vitamin D material into a sufficient amount of an organic, relatively volatile solvent therefor to effect substantial dissolution of the material therein;
   adding a quantity of a particulate, carbohydrate carrier for the material to the admixture, said carrier being substantially inert to the vitamin D and capable of substantially permanently dispersing in said food products upon addition of the composition thereto;
   removing the solvent from the final admixture to produce a substantially dry, particulate enrichment composition; and
   pulverizing the particulate composition after drying thereof to a substantially uniform, relatively small particle size.

2. A process as set forth in claim 1 wherein said carrier is finely divided lactose.

3. A process as set forth in claim 1 wherein said carrier is corn starch.

4. A process as set forth in claim 1 wherein said carrier is dry milk.

5. A process as set forth in claim 4 wherein said dry milk is of the nonfat type.

6. A process of producing a vitamin D enrichment composition for milk comprising the steps of:
   introducing a quantity of a crystalline vitamin D material into a sufficient amount of an organic, relatively volatile solvent therefor to effect substantial dissolution of the material therein;
   adding a quantity of a particulate, carbohydrate carrier for the material to the admixture, said carrier being substantially inert to the vitamin D and capable of substantially permanently dispersing in said milk upon addition of the composition thereto; and
   removing the solvent from the final admixture to produce a substantially dry, particulate enrichment composition.

7. A process as set forth in claim 6 wherein is included the step of compressing a predetermined amount of said particulate enrichment composition into a wafer.

8. A process as set forth in claim 6 wherein is included the step of introducing a quantity of a protectant into said admixture capable of preventing substantial deterioration of the vitamin material upon standing of the enrichment composition in the air.

9. A process as set forth in claim 6 wherein said solvent is an alcohol.

10. A process as set forth in claim 6 wherein said alcohol is at least approximately 90% ethyl alcohol.

11. A composition for enriching food products comprising a substantially homogeneous, dry, finely divided, completely and permanently water dispersible admixture of a water solubilized, initially crystalline vitamin D material, a protectant for said material, and a particulate, carbohydrate carrier for the material, said carrier being substantially inert to the vitamin D and capable of substantially permanently dispersing in said food products upon addition of the composition thereto, said vitamin D material being uniformly distributed throughout the carrier and contained within the individual particles thereof.

12. A composition as set forth in claim 11 wherein said carrier is finely divided lactose.

13. A composition as set forth in claim 11 wherein said carrier is corn starch.

14. A composition as set forth in claim 11 wherein said carrier is dry milk.

15. A composition as set forth in claim 14 wherein said dry milk is of the nonfat type.

References Cited in the file of this patent

UNITED STATES PATENTS 2,650,895　　Wallenmeyer ------------ Sept. 1, 1953